United States Patent Office 3,419,866
Patented Dec. 31, 1968

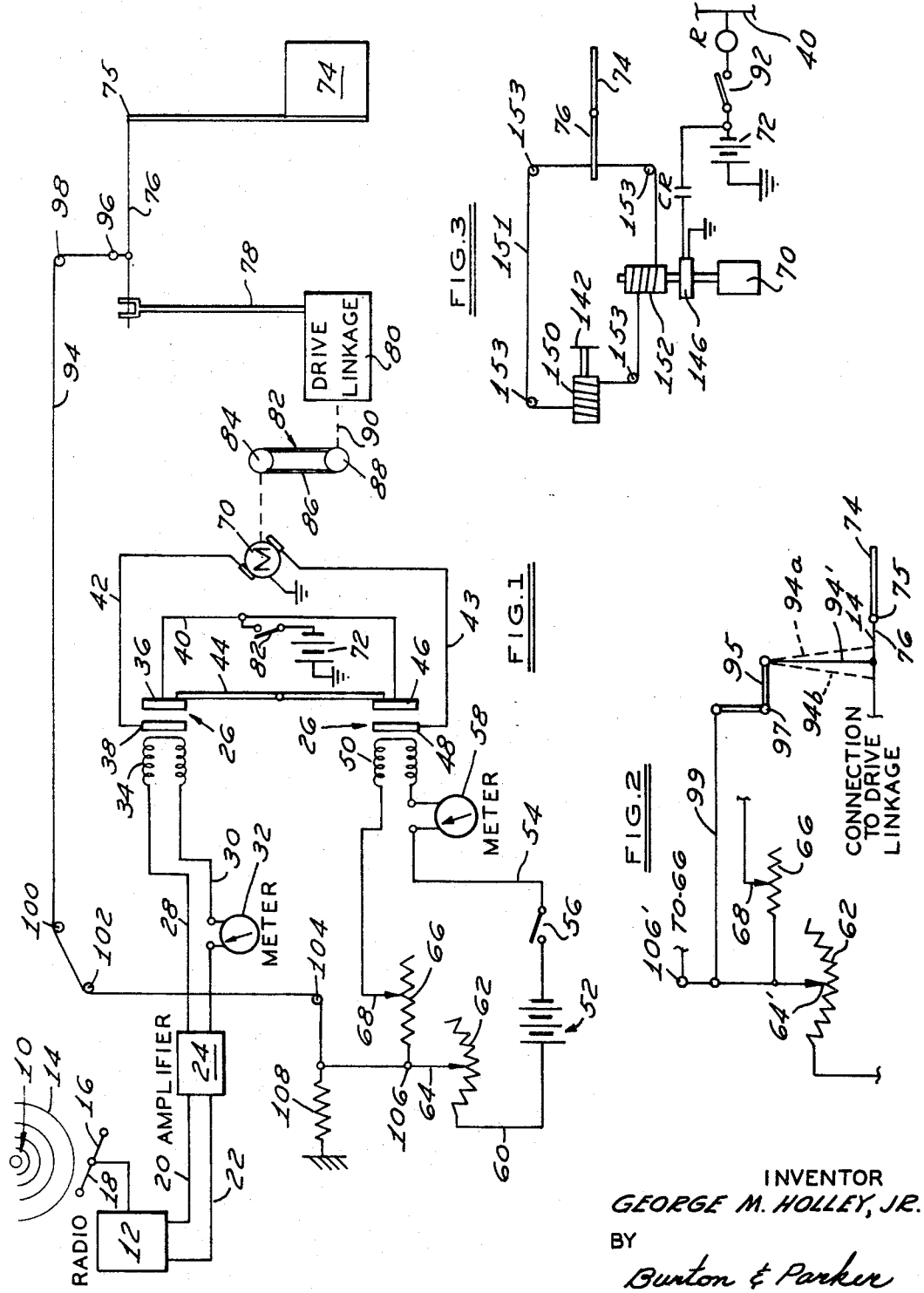

3,419,866
AUTOMATIC PILOT AND METHOD
George M. Holley, Jr., 510 Sheldon,
Grosse Pointe, Mich. 48236
Filed May 17, 1967, Ser. No. 639,090
11 Claims. (Cl. 343—117)

ABSTRACT OF THE DISCLOSURE

This disclosure relates to an inexpensive automatic pilot having particular utility for marine applications, and wherein a directional antenna on the vessel is adjusted relative to a fixed distant radio transmitter, when the vessel is on its proper course, such that deviation from such course causes the output characteristic of a radio receiver connected to the antenna to increase or decrease in accordance with the direction of the deviation, and such output characteristic's variation is utilized to automatically control the vessel's steering gear by comparing it with a reference characteristic.

---

This invention relates to an automatic piloting system and to a method of automatic piloting having particular though not exclusive utility for pleasure boats and which will relieve the boatman from the necessity of constant attention to steering the vessel.

An object of the invention is provision of an inexpensive automatic pilot which when utilized in conjunction with, for example, land based commercial radio transmitting stations, will enable the boat operator to release himself temporarily from the necessity of close attention to steering his vessel. Depending upon the distance of the transmitter, the speed of his vessel and the relative angular position of the transmitter and the intended course of vessel movement, the length of time of unsupervised steering of the vessel will vary, but in any event will, in most instances, be sufficient to afford the vessel's operator temporary relief from the necessity of manually steering the vessel. It is contemplated, for example, that a power boat making fifteen knots might cruise for an hour under control of the automatic pilot herein disclosed and thereafter the operator might resume his manual control of the vessel or upon adjustment of the control continue the automatic operation.

It is contemplated that when radio transmitting space satellites come more widely into use, the control system herein disclosed may serve to provide automatic piloting of vessels and conceivably have application for aircraft use, where distances to be covered under the automatic control are considerably greater than those normally contemplated in short run pleasure boat operation.

Other objects, advantages, and meritorious features will more fully appear from the following specification, claims and accompanying drawings wherein:

FIG. 1 is a schematic diagram of the automatic pilot control system;

FIG. 2 is a modified form of the feedback control; and

FIG. 3 is a schematic diagram representative of one form of manual override control.

In general the automatic pilot disclosed herein comprises a directional antenna connected to a receiver whose output circuit has an output characteristic, such as current, which varies in accordance with the rotated attitude of the antenna with respect to a distant transmitter. Means are provided for sensing the attitude of the antenna with respect to the transmitter so that the antenna may be set at, for example, a 45-degree angle with respect to the transmitter. A reference characteristic of essentially constant value, such as a constant current, is also provided, which may be adjusted to correspond with the output of the receiver. The receiver output is then continuously compared with the reference characteristic and depending upon whether it exceeds or falls below the reference, a reversible motor operable to control steering of the vessel and responsive to such difference will cause the vessel to return to its proper course. A feedback is also provided which is responsive to the action of the reversible motor to temporarily vary the reference characteristic to provide smoothness in the automatic pilot control of the vessel.

Referring to FIG. 1, a radio transmitter is schematically indicated at 10. This transmitter may be a commercial radio station transmitter, or some other transmitter of fixed location which emits a signal that may be picked up by a radio receiver 12 located on the vessel to be automatically piloted. The wave propagation schematically indicated at 14 from the transmitter 10 should be continuous for the form of automatic pilot disclosed herein, though with slight modification which will be apparent to those skilled in the art, the device disclosed herein could be adapted for use with intermittent wave propagation. A continuous broadcast type transmitter is contemplated for the least expensive form of the automatic pilot. The receiver 12 is provided with a directional antenna 16 mounted in any suitable fashion on the vessel for adjustable rotation relative thereto, and when once adjusted will maintain its rotated position relative to the vessel, until again adjusted. In its simplest form the radio and antenna may correspond essentially to the inexpensive transistor type pocket radio which upon being rotated about a vertical axis relative to the transmitter to which tuned is found to play louder or softer depending upon the attitude of the antenna with respect to the station. It is well understood that if the antenna 16 is located so that its plane is substantially perpendicular to a line drawn between it and the transmitting station, it will pick up the greatest radiated energy and provide the strongest signal output of the radio, while as it is rotated in either direction from such position, it will pick up decreasing amounts of the radiated energy until when its plane lies coincident with the transmitter it will be in a null position and substantially no signal will be received.

If the antenna is rotated about its vertical axis 18 relative to the radio transmitter to the position shown in FIG. 1, in other words, where it lies at an angle, such as 45 degrees, to the transmitter, further clockwise rotation will reduce its signal strength in the radio while counterclockwise rotation will increase the signal strength.

In its simplest form the invention comprehends a radio receiver having a loop antenna sensitive to the relative rotated position of the antenna to a distant transmitter, with the output circuit of the radio being connected as by leads 20 and 22 to an amplifier 24 and from thence to one side of a polarized hunting relay 26. The connection between amplifier 24 and the relay may be effected by leads 28 and 30, the latter having a meter, such as an ammeter 32 disposed therein. The leads are connected to opposite ends of a solenoid coil 34 which upon being energized will attract contact 36 toward and into engagement with contact 38 to complete a circuit between the leads 40 and 42. Contact 36 is mounted on one end of the pivoted arm 44. At the other end of the arm is a similar contact 46 which cooperates with a fixed contact 48, with contact 46 being attracted into engagement with 48 on energization of the relay 50 to complete a circuit between leads 40 and 43. It is apparent that should both the coils 34 and 50 be energized at equal current levels the relay will be in balance and the contacts 36, 38 and 46, 48 will be separated as shown in FIG. 1, while on the other hand should the energy level in coil 34 exceed that in 50, contacts 36 and 38 will close while the reverse will occur should the energy level in coil 50 sufficiently exceed that in coil 34.

The coil 50 is supplied by a source of essentially constant current indicated by the battery 52. The battery is connected to the coil by a lead 54 which includes a switch 56 and an ammeter 58. Another lead 60 is connected to a variable impedance in the form of resistor 62 having a movable contact 64 adapted to be shifted by the feedback control as hereinafter explained, and which is connected to one end of another variable impedance in the form of resistor 66 whose movable contact 68 is connected to the other end of the coil 50.

It is now apparent that by adjusting the resistor 66 to balance the attractive force of coil 50 with that of the coil 34, the hunting relay 26 will remain in its balanced position, and if the antenna 16 should rotate counterclockwise the current in the coil 34 will increase pulling the contacts 36 and 38 together to complete a circuit in the leads 40 and 42 while should the reverse occur the contacts 46 and 48 will close. Connected to these contacts is a reversible electric drive motor 70 and a source of current therefor which may be in the form of a battery 72. An off-on switch 92 for the motor may be provided. It is apparent that depending upon whether contacts 36 and 38 or 46 and 48 are closed, the motor will run in either one direction or the other.

The motor is connected to drive the steering gear of the vessel. The rudder 74 is schematically represented as being moved by an arm 76 which is shifted by another arm 78 swung by a drive linkage 80. The drive linkage is actuated in one direction or the other by suitable connections 82 with the motor 70. A variety of connections between the motor 70 and the rudder 74 are possible and will occur to those skilled in the art and therefore the connection is schematically represented. For example, it may include a sprocket 84 on the shaft of the motor which in turn drives a chain 86 entrained over another sprocket 88 mounted on a shaft 90 extending into the drive linkage 80. The drive linkage may comprise a gear reducer whose effect is to swing the arm 78 in one direction when the shaft 90 rotates clockwise, and swing the arm 78 in the opposite direction upon counterclockwise rotation of the shaft. Another form of drive connection between the motor and the rudder is shown in FIG. 3 and hereinafter described.

In order to provide stability or smooth operation for the automatic pilot, a feedback of rudder movement is required and an arrangement is provided whereby movement of the rudder in response to actuation of motor 70 causes a change in the setting of variable resistor 62 in the constant current circuit feeding the coil 50. The arrangement is such that if an increase in current causes the system to turn the rudder in a particular direction, the movement of the rudder causes the variable resistance to be changed so as to increase the current in the constant current circuit and thus balance the polarized relay 26. The ratio of movement of rudder to amount of change of current determines the sensitivity of the system. The feedback may be effected by any suitable linkage connected between the steering mechanism (or for that matter the output of the motor 70) and the variable resistor 62. As schematically shown, the linkage may be in the form of a control cable 94 connected at one end to the arm 76 and entrained through pulleys 96, 98, 100 102, 104 and connected at the opposite end to an extension of the pivot arm of the movable contact 64 of the variable resistor 62 which, arm and contact, is pivotally supported at 106 where it connects with the variable resistor 66. In order to maintain the control cable taut, suitable tension spring means 108 or equivalent may be provided. It is apparent that any desired form of the linkage between the variable resistor 62 and the steering gear may be provided and that schematically shown is a simplified representation of the concept.

Movement of rudder 74 causes variable resistance 62 to change by reason of the foregoing control cable so as to reduce or increase the constant current indicated by meter 58, thereby balancing the system.

To operate the device, the vessel is first placed upon its intended course and the radio 12, or rather its antenna 16, is tuned to a predetermined station remote from the vessel. This may be a commercial broadcasting transmitter located on land at say 40 or 50 miles distance from the vessel. The antenna is rotated until the maximum reading on meter 32 is obtained and is then rotated substantially to the position shown, i.e., at say 45 degrees from the signal of maximum strength (or its null position, as the case may be). It will be noted that with the antenna in this position relative to the transmitter, if the boat deviates from its predetermined course there will be a change in the current in the coil 34 which will be effective to cause the vessel to return to its proper course.

Next, switch 56 is closed and variable resistor 66 is adjusted to provide the same current in the meter 58 as in the meter 32. During this entire adjustment procedure the boat is manually held on the desired course. Finally, switch 92 is closed and the boat is now operating on automatic pilot. If, for example, the boat should turn to the right, the antenna 16 now in a fixed position relative to the boat assumes an attitude with respect to the transmitter such that the current indicated by meter 32 decreases. Since the current indicated in the meter 58 is constant, the coil 50 will overcome the pull of the coil 34 and the contacts 46 and 48 will close causing current to flow from the battery 72 to the motor 70 to cause it to drive the drive linkage in a direction shifting the rudder 74 to bring the boat back on course.

To prevent the drive motor from continuing to turn the rudder and thereby "overcorrecting" and resulting in a wildly swinging deviation of the vessel first from one side of the course to the other, the feedback control will serve to stop the motor 70 as soon as the rudder has turned sufficiently to cause a balancing of the currents in the coils 34 and 50. With the rudder turned, the vessel will also turn back toward its proper course, and as the boat swings it will in turn swing the antenna relative to the transmitter back toward its original adjusted position. This will cause, say an increase in the current in coil 34, which will close contacts 36 and 38, causing the motor 70 to reverse its drive and restore the rudder to its original position. Should there arise a cross wind or other constant disturbing force on the hull, the operator may wish to readjust the system to avoid continual hunting of the vessel, i.e., manually reset the rudder to steer the proper course and then equalize the currents in the two circuits by adjusting the variable resistor 66 (or shifting the antenna 16 slightly) and then locking in the system again.

When taking a course directly to the radio transmitter, or directly away from the transmitter, the boat will remain on its true course without requiring adjustment of the automatic pilot. However, if the desired course is not directly toward or from the transmitter, some consideration must be given in the setting of the pilot. For example, if a vessel equipped with the pilot is five miles off shore and proceeding north past Miami toward Fort Lauderdale, Fla., and the radio is tuned on a Miami radio station, the boat will gradually turn and if adjustments are not periodically made, steer a curving course toward shore. However, this may be overcome by tuning in on a station, for example, at Nassau in the Bahamas. The distance of the radio transmitter at such a station to a point five miles off Miami is so great that the deviation in travel from Miami to Fort Lauderdale would be negligible.

In FIG. 2 I have schematically shown a top view of a feedback control in which the sensitivity of the system may be readily varied. Depending upon the size of the boat and other factors, the operator will want greater or lesser sensitivity. The rudder is indicated at 74 being pivoted at 75 with the control arm 76 having connected to it for adjustment therealong a rod 94'. The other end of the rod is connected to a bell crank 95 pivoted at 97 and connected by a rod 99 to the movable tap 64' of the variable resistor 62. The movable tap is pivoted at 106'. The point of connection of rod 94' to the control arm 76 may be varied, for example, between the dotted outline positions 94a and 94b. It will be apparent that when the rod 94' is connected to the arm 76 as at 94a, swinging of rudder 74 will cause less movement of the bell crank 95, and in turn of the tap 64' of the variable resistor, and the automatic pilot will therefore be less sensitive. If the rod 94' is adjusted to a position such as 94b, the automatic pilot will be more sensitive.

In FIG. 3 there is a top view of a schematic form of the steering mechanism showing one arrangement for connecting the reversible motor 70 to the rudder, and allowing for manual override should the operator desire it. A conventional steering wheel for the vessel is indicated at 142. It is connected to drive a drum 150 about which is wrapped a control cable 151, opposite ends of which are connected to the rudder arm 76. The control cable is also wound about a drum 152. Suitable pulleys 153 are provided for guiding the control cable. The motor 70 is connected to the drum 152 through an electric clutch 146 connected through relay contact CR in the circuit of battery 72. Whenever the motor 70 is energized, the relay R causes the clutch to be engaged whereby the motor 70 drives the drum 152. When the motor 70 is de-energized the clutch is de-energized, leaving the vessel's steering mechanism mechanically disconnected from the motor to enable manual turning of wheel 142. On the other hand, a simple on-off switch to energize or de-energize the electric clutch 146 may be associated with the switch 92 and the electric clutch left energized whenever the automatic pilot is in operation. The necessity for the electric clutch arises from the fact that the motor 70 includes a gear box in the environment of FIG. 3 so that the drum 152 would turn slowly. This gear box would inhibit manual operation of the steering system in the absence of a clutch.

In the foregoing description I have referred to polarized hunting relay 26 as being responsive to variation in current in the first circuit coil 34 and as being in a balanced condition when the currents in the two circuits are equal. It will be apparent to those skilled in the art that instead of responding to current changes, the relay may be responsive to voltage changes by connecting each relay coil 34 and 50 across a suitable resistance. This like other changes may be made without departing from the spirit of the invention.

The foregoing description and drawings show the fundamental system. The radio circuit itself, for example, is not shown for such circuit could be as simple as a pocket transistor radio or as complex as the designer feels necessary. It might have a single AM channel or all of the marine and long and shortwave channels. Also, the circuits shown have been purely for the purpose of illustrating the basic solution to the provision of an inexpensive automatic pilot and various modifications will occur to those skilled in the art.

In the claims, the term vessel is intended to comprehend any steerable carrier, whether a boat, aircraft or land vehicle, in which the automatic pilot might find application.

What is claimed is:

1. A method of automatically piloting a vessel comprising: pointing the vessel in the intended direction of travel, adjusting a directional antenna on the vessel in relation to a distant radio transmitter such that deviation of the vessel from its course will increase or decrease the signal strength induced by the transmitter in the antenna in accordance with the direction of deviation, providing a reference signal, sensing an increase or decrease of signal strength in the antenna, comparing the increased or decreased signal induced by the transmitter with the reference signal, and actuating the steering mechanism of the vessel to cause the vessel to turn in a direction that will equalize the strength of the signals.

2. The invention defined in claim 1 characterized by varying the reference signal in response to an actuation of the steering mechanism of the vessel to equalize the signals prior to the vessel returning to its originally pointed direction of travel.

3. An automatic pilot comprising: a directional antenna and a radio receiver connected thereto having an output circuit whose output characteristic rises and falls in accordance with the rotated position of the antenna relative to a distant transmitter, means for providing an electrical reference characteristic for comparison with the output characteristic of the receiver, means for comparing the output characteristic with the reference characteristic, reversible motor means for connection to the steering mechanism of a vessel on which the automatic pilot is mounted for actuating such mechanism to steer the vessel, and said motor connected to the comparing means and responsive to the latter to operate in one direction or the other in accordance with the variation of the output characteristic of the receiver in relation to the reference characteristic.

4. The invention defined by claim 3, characterized in that said means for providing the reference characteristic is responsive to determined actuation of the reversible motor to vary the reference characteristic in a direction causing the comparing means to discontinue operation of the motor prior to the output characteristic reaching its original value.

5. The invention defined by claim 4, characterized in that said means for providing the reference characteristic being adjustably responsive to actuation of the motor to vary sensitivity of response to such actuation.

6. The invention defined in claim 3, characterized in that said means for providing the reference characteristic is adjustable to vary the reference characteristic to equate it to the output characteristic, and said means for comparing the two characteristics comprises a polarized device operable to conduct a current in one direction for delivery to said motor when the output characteristic exceeds the reference characteristic and operable to conduct a current in the opposite direction when the output characteristic falls below the reference characteristic.

7. The invention defined by claim 3, characterized in that means are provided connected to the output circuit of the receiver for sensing the output thereof to determine the angular position of the antenna in relation to a distant transmitter to enable positioning of the antenna at an angle to the transmitted wave lying between the null and maximum signal positions.

8. An automatic pilot system comprising: a directional antenna for rotation relative to a vessel on which the system is mounted, a radio receiver connected to the antenna and having an output circuit including an amplifier and one coil of a polarized hunting relay, means in such circuit responsive to the output of the receiver for indicating maximum signal strength and null positions of the antenna relative to a distant transmitter for enabling adjustment of the antenna to a position lying intermediate such maximum signal and null positions, a reference circuit including the other coil of the polarized hunting relay and a variable impedance for balancing the currents in the relay coils of the circuits, a reversible motor, a source of power for such motor connected to said relay to actuate the motor in one direction or the other in accordance with the current in one relay coil exceeding the current in the other, said motor adapted to be connected to the steering mechanism of the vessel to control operation thereof, and means connected to said variable impedance and responsive to determined actuation of said motor to vary the impedance of the reference circuit to actuate the relay and stop the motor prior to the output circuit response to rotation of the antenna altering current in the relay coil of the output circuit actuating the relay.

9. The invention defined in claim 8 characterized in that said reference circuit includes a second variable impedance adjustable to match the currents in the said relay coils of the reference and output circuits.

10. The invention defined by cliam 8, characterized in that said reversible motor is provided with a clutch for selectively connecting and disconnecting it to the steering mechanism of the vessel.

11. The invention defined in claim 8 characterized in that said means connected to the variable impedance being adjustably responsive to actuation of the motor to vary sensitivity of response of impedance variation to motor actuation.

References Cited
UNITED STATES PATENTS

| | | |
|---|---|---|
| 2,429,642 | 10/1947 | Newton. |
| 2,855,597 | 10/1958 | Richardson _____ 343—117 |
| 3,042,917 | 7/1962 | Elhoff _____ 343—117 |

RODNEY D. BENNETT, *Primary Examiner.*

RICHARD E. BERGER, *Assistant Examiner.*